United States Patent
Dehelean et al.

(10) Patent No.: US 10,151,134 B2
(45) Date of Patent: Dec. 11, 2018

(54) METHOD FOR OPENING A MOVABLE PANEL OF THE MOTOR VEHICLE AND CORRESPONDING OPENING CONTROL DEVICE

(71) Applicants: U-SHIN FRANCE SAS, Creteil (FR); Volkswagen Aktiengesellschaft, Wolfsburg (DE)

(72) Inventors: Theodor Dehelean, Erdweg (DE); Dragos Molocea, Erdweg (DE); Bernd Ette, Wolfsburg (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 149 days.

(21) Appl. No.: 15/118,324

(22) PCT Filed: Apr. 7, 2015

(86) PCT No.: PCT/EP2015/057519
§ 371 (c)(1),
(2) Date: Aug. 11, 2016

(87) PCT Pub. No.: WO2015/155186
PCT Pub. Date: Oct. 15, 2015

(65) Prior Publication Data
US 2017/0152697 A1    Jun. 1, 2017

(30) Foreign Application Priority Data
Apr. 10, 2014    (EP) .................................. 14164189

(51) Int. Cl.
*E05F 15/73*    (2015.01)
*B60R 25/20*    (2013.01)
*G07C 9/00*    (2006.01)

(52) U.S. Cl.
CPC .......... *E05F 15/73* (2015.01); *B60R 25/2054* (2013.01); *G07C 9/00309* (2013.01);
(Continued)

(58) Field of Classification Search
CPC ............ G07C 2209/08; G07C 9/00309; G07C 2009/00793; G07C 9/00103; G07C 9/00182; G07C 9/00571; G07C 9/00817
(Continued)

(56) References Cited

U.S. PATENT DOCUMENTS 8,860,316 B2 * 10/2014 Barrilleaux ........ H05B 37/0245
315/152
2008/0296926 A1    12/2008 Hanzel et al.
(Continued)

FOREIGN PATENT DOCUMENTS

DE    102012017393 A1    3/2014
FR    2979873 A1    3/2013
WO    2013053451 A1    4/2013

OTHER PUBLICATIONS

International Search Report issued in corresponding application No. PCT/EP2015/057519 dated Aug. 18, 2015 (5 pages).
(Continued)

*Primary Examiner* — Mark Blouin
(74) *Attorney, Agent, or Firm* — Osha Liang LLP

(57) ABSTRACT

The invention relates to a method for opening a movable panel of a motor vehicle, comprising the following steps of: —projection of at least one light spot (102) with which an authorized user (U) has to interact, —determining if there is an intention to open the panel (100), and if so—authorizing the opening of the panel (100). The step of determining if there is an intention to open the panel (100) comprises: —acquiring a measurement signal of a movement performed by the user (U), —filtering the signal, —identifying if the
(Continued)

Figure 1:
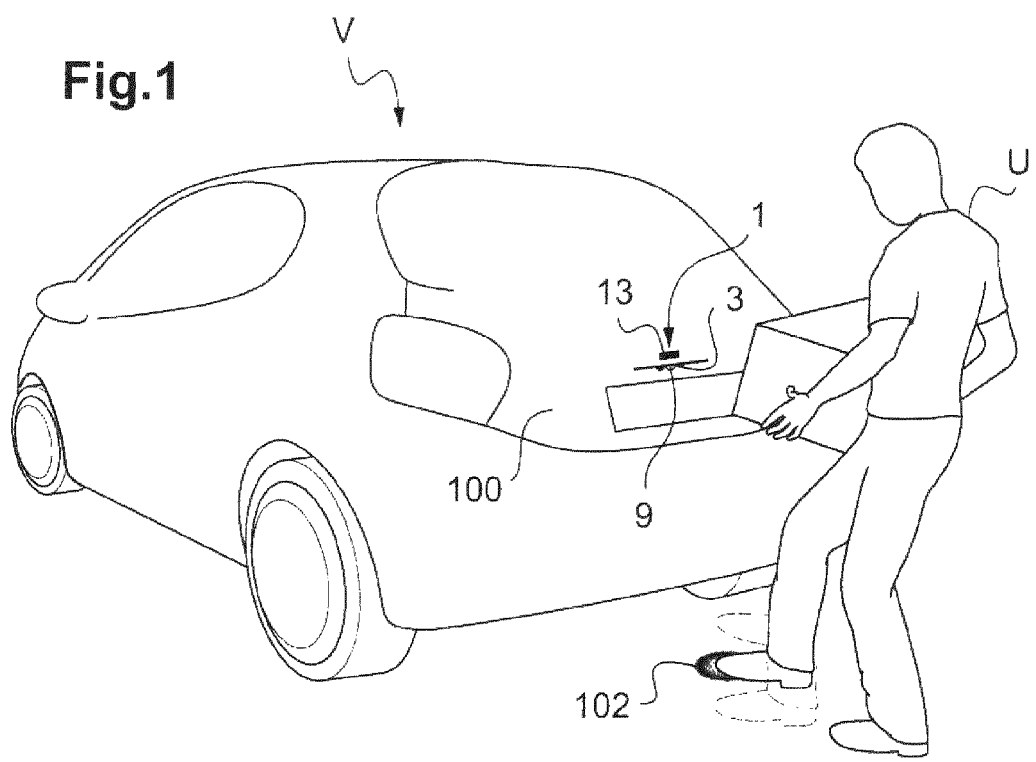

movement performed by the user (U) is in a predefined correct order with at least the following steps: moving the user's part towards the light spot (102), keeping it in the light spot (102) and moving it outside the light spot (102), and
—determining if the movement performed by the user (U) meets a predefined specific time condition.

19 Claims, 3 Drawing Sheets

(52) U.S. Cl.
CPC ...... *B60Q 2400/40* (2013.01); *B60R 25/2045* (2013.01); *E05F 2015/765* (2015.01); *E05Y 2400/82* (2013.01); *E05Y 2400/852* (2013.01); *E05Y 2400/858* (2013.01); *E05Y 2900/531* (2013.01); *E05Y 2900/546* (2013.01); *G07C 2209/64* (2013.01)

(58) Field of Classification Search
USPC .......................................................... 340/5.28
See application file for complete search history.

(56) References Cited

U.S. PATENT DOCUMENTS

| 2014/0009264 A1* | 1/2014 | Song | G08C 19/00 340/5.64 |
| 2014/0169139 A1* | 6/2014 | Lee | G08C 17/00 367/197 |
| 2018/0094954 A1* | 4/2018 | Eberhard | B60R 19/483 |

OTHER PUBLICATIONS

Written Opinion of the International Searching Authority issued in corresponding application No. PCT/EP2015/057519 dated Aug. 18, 2015 (5 pages).

* cited by examiner

METHOD FOR OPENING A MOVABLE PANEL OF THE MOTOR VEHICLE AND CORRESPONDING OPENING CONTROL DEVICE

The invention relates to a method for opening a movable panel of the motor vehicle. The invention also relates to an associated opening control device.

There are known devices for opening a movable panel of a motor vehicle using the physical contact of the hand or finger of the user to a switch or handle for opening said movable panel of the motor vehicle after unlocking. The movable panel is typically a trunk or a side door.

However, this type of opening requires the user to have a free hand. Thus, as an example if the user has all his/her hands already occupied or is unable to use his/her hands, there is a need to allow the opening of a movable panel of a motor vehicle without the use of physical contact of the user's hands with the switch or handle.

For that purpose, it is known to provide an opening device of a movable panel in which a sensor is used to activate a command for opening the movable panel. It is thus necessary to detect first the presence of a user in the vicinity of the vehicle.

However, since the opening of the vehicle is possible without physical contact with the vehicle, it is required to prevent from intrusion of an ill-intentioned person in the vehicle.

For that purpose, it is known to authenticate the user as authorized to unlock the vehicle prior to the activation of the command for opening of the movable panel.

Moreover, in order to avoid an unintended opening of the vehicle movable panel, it is known to seek to recognize an intention of the user to open the movable panel. For that purpose, according to a known solution a virtual switch is activated, for example a light spot is projected on the ground, and the user has to place or move a human part, his/her hand or foot, in a predetermined manner in order to obscure the light spot for example. If this has been well done, an intention to open is detected and the movable panel is opened.

Further, the hand or foot movement made by the user is detected by a sensor, as an example an infrared sensor. In the infrared range of the sensor measurement, the textures of different materials have different reflectivity. The sensor can measure the variation from the reflectance of the floor to the reflectance of the shoe as a change in a one-dimensional signal.

The ideal shape of a hand or foot movement should look like a pulse waveform.

However, the detection is not simple because the shape of the measurement signal is not as simple as a pulse waveform. Indeed, in practice, the reflectivity of the clothes is not homogenous, and the additional variations of reflectance may induce some noise in the signal. There are additional oscillations that can occur at insertion of the shoe for instance, due to the additional variations in the reflectivity of the shoe or the reflectance of the shoe and clothes.

Consequently, the signal detected by the sensor can have a high variety of shapes for a same movement of the shoe, e.g. due to various textures and shapes of the shoe, due to various textures of the floor, due to various environmental light and humidity conditions, due to the different reflexivity properties for the trousers and for the shoe for example, the fact that the texture of a shoe is not homogenous, or the fact that the trouser or hose can enter in the area of the sensor measurement. Thus, the shapes of the measurement signals are complex.

Particularly when having only one sensor for detecting a triggering movement for opening the movable panel, because of these noise oscillations, an illegitimate movement also named "false" movement could open the movable panel. Movements are considered as illegitimate or false, when they are relative to objects or animals that must not open the movable panel.

Hence, as a consequence of this, it is necessary to extract only the relevant information from such complex waveform shapes, in order to eliminate the validation of "false" movements that could open the movable panel. In other words, an object of the invention is to prevent from the opening of the trunk triggered for instance by an animal or a ball passing by the vehicle slowly.

The purpose of this invention is to recognize specific waveform patterns by extracting only the relevant information from complex waveform shapes as discussed above.

This object is achieved according to the invention by a method for opening a movable panel of a motor vehicle, comprising the following steps of:
  activating at least one virtual switch with projection of at least one light spot with which an authorized user has to interact,
  determining if there is an intention to open the movable panel, and
  authorizing the opening of the movable panel if an intention to open the movable panel is detected, characterized in that the step of determining if there is an intention to open the movable panel, comprises the sub-steps of:
acquiring a measurement signal of a movement performed by the user in a measurement area,
eliminating the noise by filtering the signal,
identifying if the movement performed by the user is according to a predefined triggering sequence in a predefined correct order with at least the following steps: moving at least one user's part towards the light spot, keeping the user's part in the light spot and moving the user's part outside the light spot, and
determining if the movement performed by the user meets a predefined specific time condition.

The method is used to recognize a specific movement, characterized by a correct sequence order even with noise, for example due to reflexivity variation of clothes. It is possible to differentiate a specific movement of the user's part, such as a foot in the detection area measured by infrared sensor, by additional processing of the signal detected by the sensor.

This method helps to identify a "false" movement and not to validate such "false" movement.

For that purpose, the method is based on splitting the movement of the user in at least three phases:
  insert the user's part in the light spot,
  keep the user's part in the light spot advantageously for a specific time,
  take out the user's part from the light spot.

The final position of the trigger for opening the movable panel, such as the trunk, is when the hand or foot is completely out of the light spot. By retracting the hand or foot from the light spot, the opening of the vehicle door, such as the trunk, can be triggered. In other words, the trunk or other movable panel of the vehicle can open after the hand or foot is completely taken off from the light spot. Thus, the step of authorizing the opening of the movable panel occurs if the light spot is completely freed up by the user.

According to a preferred embodiment, the user performs the triggering sequence with his or her foot.

Further, at least one specific time condition is predefined such that the method provides more accurate results. Indeed, the one or more time constraints impose the user to perform a more precise triggering sequence. Consequently, the risk of validating a "false" movement that does not reflect an intention to open of an authorized user is largely minimized.

According to an aspect of the invention, the method comprises a step of measuring the time elapsed for the step of keeping in the light spot, and a step of determining if the measured elapsed time is comprised in a predefined time interval for keeping the user's part in the light spot.

Advantageously, a specific time condition is set for the step of keeping the foot in the light spot in order to avoid the validation of a "false" movement for instance because of an object or animal passing by the vehicle or even an authorized user walking around the vehicle.

Indeed, an authorized user walking around the vehicle, but focused on something else than the opening of the movable panel, e.g. speaking at the mobile phone and without any intention to open the movable panel, is detected but if the user moves in the measurement area with a timing that does not met the one or more time constraints, the detection can be invalidated, so that the opening of the movable panel is not triggered.

If this time condition is not true, the opening of the movable panel cannot be triggered. This advantageously avoids that an impromptu object such as a tree branch, or a ball or a small animal may activate the movable panel opening by interacting with the light spot.

According to an embodiment, the predefined time interval for keeping the user's part in the light spot sets a minimum in the range of a half-second to one second, and a maximum in the range of three to nine seconds.

The time interval is set depending on inherent sensor properties, particularly regarding the minimum of the time interval. As an option, the maximum of the time interval can be calibrated by the user for instance. The user may have the possibility to customize for instance his or her foot movement timing when a response of opening the movable panel is expected.

The method may comprise a step of sending a warning signal to indicate the user that the duration of the step of keeping his or her foot or hand in the light spot is out of the predefined time interval.

According to another aspect of the invention, the method comprises a step of measuring the time elapsed between activating the virtual switch and the moment of placing the user's part in the light spot, and a step of determining if the measured time is comprised in a predefined time window.

With this other time condition, the idea is to use a defined time window for detection of the user's hand or foot in the measurement area for example of a sensor such as an infra-red sensor. That is a simple possibility to distinguish between intentional use of the sensor and misuse or unintentional use, e.g. an object such as a crossing ball or an animal, which would not follow the valid time constraints.

For example, once the virtual switch is activated, the time to place the user's part such a hand or a foot into the light spot should be between two seconds and thirty seconds, otherwise the triggering movement performed is ignored.

The method according to the invention may also comprise the following steps of:

quantifying the variations of the effective signal after filtering for eliminating the noise, based on the quantified variations, identifying the steps of the movement performed by the user, and determining if at least one of the identified steps meets the predefined specific time constraint, and determining if the steps have been performed in the correct predefined order.

The method may comprise a sub-step of converting the analog measurement signal to digital signal before filtering the signal.

Those processing steps of the method lead to link the several parts of the measured signal for instance through an infra-red sensor with gestures, such as kick-in or kick-out gestures, performed by the user. That makes it possible to verify if the one or more time constraints are satisfied and to establish the order of the triggering sequence performed by the user.

According to another aspect of the invention, the method comprises a sub-step of calculating a reference value based on the floor measurement and a sub-step of comparing the filtered signal with the reference value, and wherein the variations of the effective signal are quantified based on the comparison results.

Accordingly, the method may further comprise a sub-step of comparing the absolute difference between the filtered signal and the reference value with a preset threshold for quantifying the variations. As an example, kick-in gesture information is set whenever said absolute difference is higher than the preset threshold, and kick-out gesture information is set whenever said absolute difference is back lower than a smaller preset threshold for setting the kick-in gesture information.

The variations quantified using the absolute difference between the filtered value and the reference value, allows defining in a simple way when the user has performed a kick-in gesture and a kick-out gesture, and the step of keeping the user's hand or foot in the light spot. Calculating the absolute difference for quantifying the variations is particularly advantageous due to the fact that a kick-in gesture may not always be reflected by a rising variation, respectively falling variation, and by the same way a kick-out gesture may not always be reflected by a falling variation, respectively rising variation.

Then, the order of the triggering sequence performed by the user can be easily determined for comparison with the predefined correct order.

If the triggering sequence has been performed in an incorrect order, the method may have a step of sending a warning signal to indicate the user to perform again the triggering sequence.

The method may also comprise preliminary steps of detecting the approach of the user in the vicinity of the vehicle, and identifying if the detected user is authorized to unlock the vehicle through authentication means.

The step of detecting the approach of a user in the vicinity of the vehicle can be performed by one or more optical detectors, for example infrared detectors. In that case, at least two infra-red sensors may be mounted on the vehicle, one for the approach detection and another one for acquiring a measurement signal of the movement performed by the user.

Preferably, the virtual switch is activated only when the user is authenticated thus lowering the required electrical resources.

The method may further comprise a step of correlating signals information from the approach detection device and from the sensor intended to acquire measurement relative to the performed triggering movement. Indeed, in case for instance the user walks around the vehicle, it may happen that the sensor measurement area is hit with a timing that met the constraints, but such movement can be detected by the approach sensors and the triggering sequence detection can be invalidated if it is detected that the user just walks around the vehicle.

According to an embodiment, the method may comprise previous steps of:
  detecting when the environmental conditions of the vehicle change, for instance when the texture of the floor changes, and
  triggering a calibration routine for the acquiring means, the acquiring means comprising preferably an optical sensor such as an infra-red sensor.

The invention also relates to an opening control device for opening a movable panel of a motor vehicle, comprising at least one processing means for:
  activating at least one virtual switch with projection of at least one light spot with which an authorized user has to interact,
  determining if there is an intention to open the movable panel, and
  authorizing the opening of the movable panel if an intention to open the movable panel is detected,
characterized in that said device comprises at least one means for:
  acquiring a measurement signal of a movement performed by the user in a measurement area,
  eliminating the noise by filtering the signal,
  identifying if the movement performed by the user is according to a predefined triggering sequence in a predefined correct order with at least the following steps: moving at least one user's part towards the light spot, keeping the user's part in the light spot and moving the user's part outside the light spot, and
  determining if at least one step of the movement performed by the user meets a predefined specific time condition.

The opening control device according to the invention may also comprise one or more of the following features, taken separately or in combination:
  said opening device comprises projection means for projecting on the ground on which the motor vehicle stands at least a light spot;
  said opening control device comprising at least one processing means for determining when the user has completely freed up the light spot;
  said opening control device comprises at least one processing means for:
    measuring how long the user places one user's part in the light spot, and
    determining if the measured elapsed time is comprised in a predefined time interval for keeping the user's part in the light spot;
  said opening control device comprises at least one processing means for:
    measuring the time elapsed between activating the virtual switch and the placement of the user's part in the light spot, and
    determining if the measured time is comprised in a predefined time window;
  said opening control device comprises at least one sensor, for acquiring a measurement signal of the movement performed by the user, for example an optical sensor such as an infra-red sensor;
  said opening control device comprises a mean average filter with zero-order hold for filtering the measurement signal and eliminating the noise. The noise is flattened in order to keep only the effective signal with relevant information representative of the movement performed by the user;
  said opening control device comprises an analog to digital converter for converting the measurement signal before filtering;
  said opening control device comprises at least one processing means for calculating a reference value based on the floor measurement, such as a mean average filter;
  the reference mean average filter may have as input the output of the mean average filter with zero-order hold wherein each detected pulse reflecting a user gesture is removed;
  said opening control device comprises processing means:
    for comparing the filtered signal with the reference value,
    for quantifying the variations of the effective signal based on the comparison results, for instance by comparing the absolute difference between the filtered signal and the reference value with a preset threshold,
    for identifying the steps of the movement performed by the user based on the quantified variations, and
    for determining if the steps have been performed in the correct predefined order;
  said opening control device comprises feed-back means for warning the user when interacting with the light spot;
  said opening control device comprises:
    a detection device for detecting the approach of a user in the vicinity of the vehicle, including one or more optical detectors, for example infrared detectors, and authentication means for identifying if the detected user is authorized to unlock the vehicle.

Figure 2:
Figure 3A:
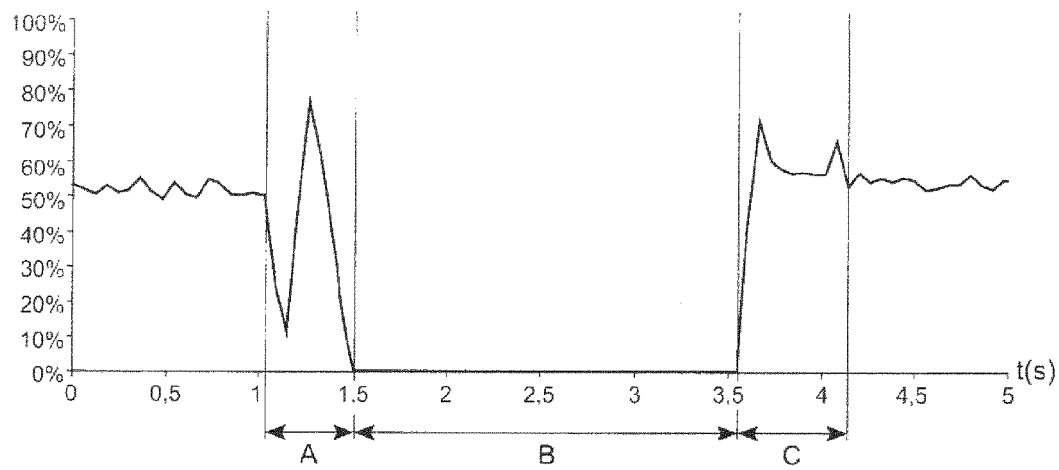
Figure 3B:
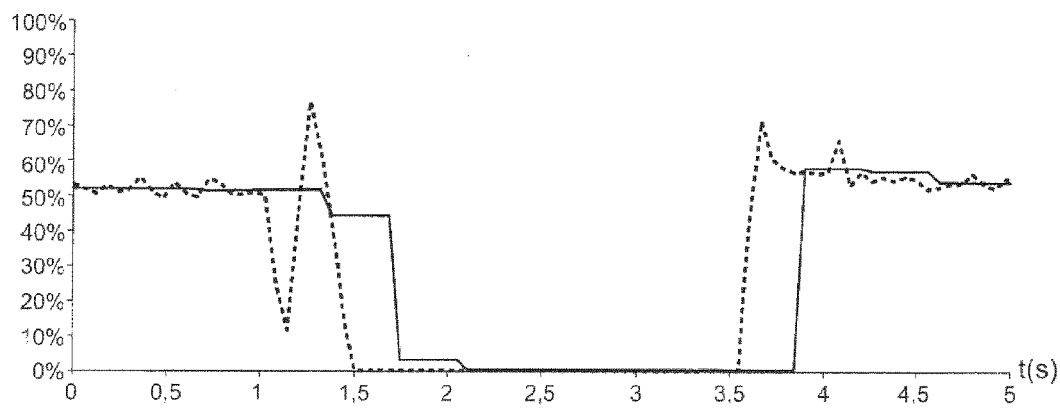
Figure 3C:
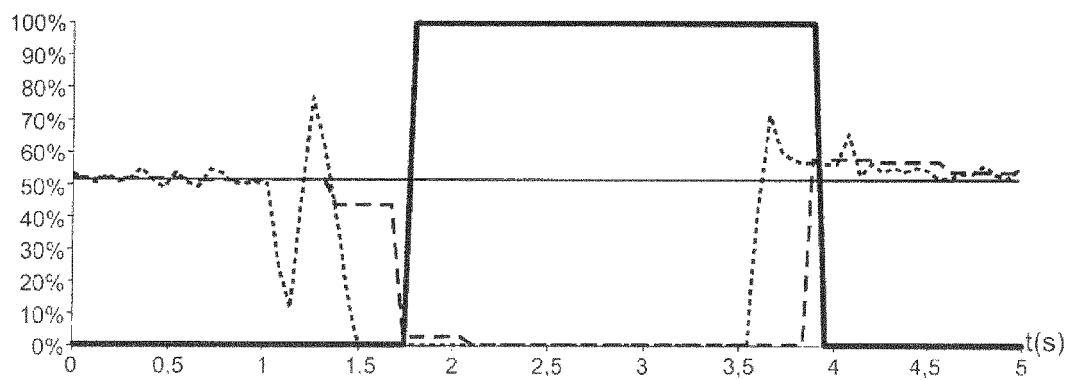
Figure 4A:
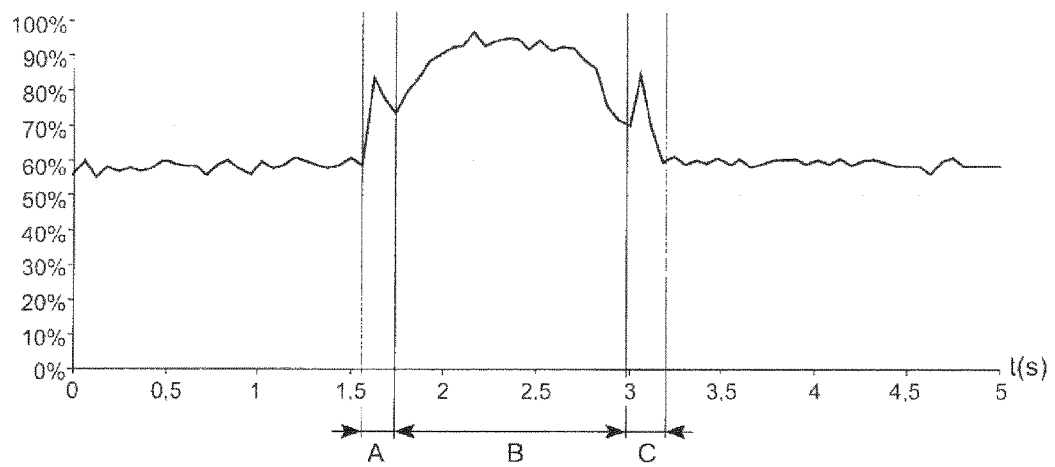
Figure 4B:
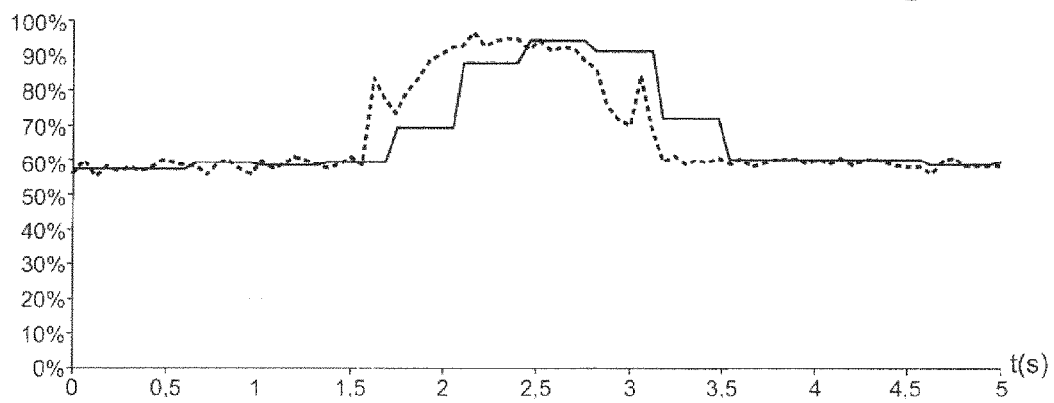
Figure 4C:
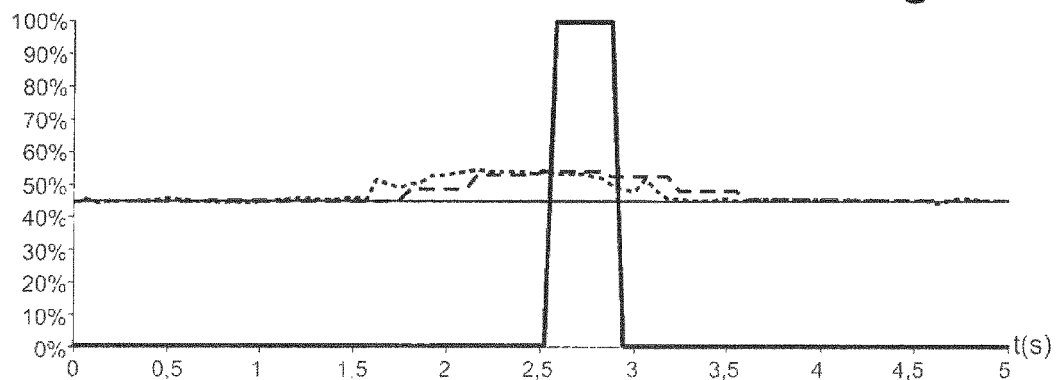

Other features and advantages of the invention will emerge more clearly on reading the following description, which is given as a non-limiting illustrative example, and the attached drawings, among which:

FIG. 1 is a perspective view showing a motor vehicle with an opening control device for detecting an intention to open a movable panel of the motor vehicle before triggering the opening of the movable panel, FIG. 2 is a flow chart of the main steps of the method according to the invention, FIG. 3a is a graph plotting as ordinate the amplitude of a signal detected by a sensor when performing a first example of triggering movement and time as abscissa, FIG. 3b shows in dotted line the waveform of FIG. 3a and in solid line the resulting function after average with zero-order hold filtering, FIG. 3c is a graph showing in dotted line the initial waveform and in dashes the resulting function after average with zero-order hold filtering of FIG. 3b, and showing in solid line a reference value and in bold line a signal change detection state, FIG. 4a is a graph plotting as ordinate the amplitude of a signal detected by a sensor when performing a second example of triggering movement and time as abscissa, FIG. 4b shows in dotted line the initial waveform of FIG. 4a and in solid line the resulting function after average with zero-order hold filtering, and FIG. 4c is a graph showing in dotted line the initial waveform and in dashes the resulting function after average with zero-order hold filtering of FIG. 4b, and showing in solid line a reference value and in bold line a signal change detection state.

METHOD

The invention relates to a method for opening a movable panel 100 of a motor vehicle V (FIG. 1) without requiring physical contact of a user with a switch or handle of the vehicle panel 100. Such a method may be performed by an opening control device 1 described later.

In the illustrated embodiment of FIG. 1, the movable panel 100 to be opened is the trunk. Of course, it could be any other movable panel of the vehicle, such as a sliding side door.

The method may comprise an early step of predefining a correct triggering sequence to be performed by the user, with his/her hand or foot for example, for triggering the opening of the movable panel 100.

A correct triggering sequence is in a preferred embodiment segmented in at least three parts. Firstly, the human part such as a foot has to move towards a light spot 102 projected on the ground and with which the user U has to interact in order to trigger the opening of the movable panel 100, then wait on the light spot, and finally move outside the light spot.

Before trying to recognize a correct triggering sequence for opening the movable panel 100, the method may comprise a preliminary step of detecting the approach of a user U near the vehicle V. This approaching detection step may be performed by one or more optical detectors 3 as a non limited example. For that, at least a portion of the body of a user U may be detected.

Once a user U is detected, a step of authenticating the detected user U as authorized to unlock the vehicle V may be performed through authentication means. That is a step to verify and validate the identity of a user U to be entitled to access to the vehicle V.

As shown in FIG. 2, the method can perform the following steps S10, S20, S30, S40, S50, for detecting an intention to open of the user U and opening the movable panel 100 of the motor vehicle V. In a preferred embodiment, these steps S10 to S50 may be performed only if an authorized user U is identified.

At step S10, an approach of the subject is detected. Following this event, at least one virtual switch is activated for triggering the opening command of the movable panel 100. As an example, a light spot 102 may be projected on the ground on which the motor vehicle V stands as shown in FIG. 1. The projection may be performed through projection means 9 of the opening control device 1. Acquiring means such as an optical sensor 13 can be activated The virtual switch may be activated, and thus the light spot 102 may be projected, only if the approaching user is authenticated. This avoids a permanent projection of triggering area.

Then, the method aims to determine if there is an intention to open. An intention to open the movable panel 100 is detected if the user U performs at step S20 a movement which is then analyzed at step S30 to determine at step S40 if this movement matches a predefined correct triggering sequence in the correct order and meets at least one predefined specific time condition as detailed hereafter.

At step S20, the user U performs a movement for opening the vehicle movable panel 100. The user U has to perform the predefined triggering sequence in the correct order. Of course, the user U has to learn to use this specific approach (the predefined triggering sequence in correct order) in order to open it.

At step S20, the user U may insert a part of the body in the area marked by the spot 102, manifesting the intention of opening the vehicle movable panel 100. Immediately after the insertion was qualified as kick-in, the sensor provides an optical feedback to the user: for example either by changing the color of the spot, either by changing the shape of the spot, either by changing from a steady spot to a blinking spot, or by switching on the brake light.

According to the illustrated example in FIG. 1, the user U has to move one human part, such as one hand or one foot, for performing the predefined triggering movement, in a sensor measurement area defining the triggering area, which can be wider than the light spot 102. Such triggering movement comprises in this example, a kick-in gesture towards the light spot 102 and then a kick-out gesture outside the light spot 102. Before, completely leaving the light spot 102, the user's hand or foot has to be kept in the light spot 102, while moving or non-moving, for a predefined lapse of time.

The movement performed by the user U is then analyzed at step S30 before determining if this movement matches the correct predefined triggering sequence for opening the movable panel 100.

For that purpose, the method comprises a measurement through a sensor, for instance an optical sensor such as an infra-red sensor 13. A representative signal measurement of the performed movement is thus acquired for instance through the infra-red sensor 13.

the analog signal measured by the sensor 13 may be converted to a digital signal, hereafter named ADC signal. The waveform of the ADC signal is visible on the graph in FIG. 3a or 4a, with the time in seconds as abscissa and the digital values proportional to the ratio between the analog input and the maximum value of the measurement signal as ordinate.

As a non limiting example, the digital value is for instance calibrated on the floor at 50% (FIG. 3a) or 60% (FIG. 4a) of the maximum measurement amplitude (100%), due to the fact that the signal level can go as well up or down. The signal level may increase or decrease depending on the reflexivity of the shoe relating to the reflexivity of the floor.

Each time the environmental conditions are changing, e.g. the texture of the floor is changing; a sensor calibration routine may be triggered. The role of the calibration is to change the measurement range of the analog-to-digital converter in such a way that the signal coming from the floor is centered near to the calibration value, such as 50%, of the maximum measurement amplitude.

The sensor calibration routine may be done before S10, in advance to the insertion of the foot in the spot.

Due to the fact that the calibration of the ADC takes a few seconds, the calibration cannot be triggered after an approach was detected: The user might wish to open the trunk before the calibration routine had the chance to finish. There is an option to keep the spot 102 off while calibrating, but that would bring an uncomfortable delay of a few seconds from the moment the approach was detected until switching on the spot signal 102.

Therefore, the information that the floor has changed may be determined by ignition KL15 switched from on position to off position.

Optionally, the information that the floor has changed may be determined by detecting a parking maneuver.

Also, the information that the floor has changed may be determined if the reference value for the comparison gets too close* to the maximum ADC measurement range or too close* to minimum ADC measurement range:

"too close*" is a parameter which value lies between around 40% and 10% of the total ADC measurement range. According to the described embodiment, the reference value for this comparison is the level of the signal while measuring the floor. After sensor acquisition calibration, the reference value for the floor measurement should be around 50% of the maximum value of the measurement signal.

The ADC signal may be segmented in at least three zones "A", "B", "C". The first zone "A" corresponds to the insertion of the human part, in this example a foot, in the light spot 102. The second zone "B" is when the foot is kept in the light spot 102. The third zone "C" corresponds to the removal of the foot outside the light spot 102.

In both examples shown in FIG. 3a or 4a, before processing the signal, an oscillation while inserting the foot, which goes in both directions, can be observed. This oscillation may be due to the presence of laces on the shoe, or to the fact that the infra-red sensor 13 detects first the shoe and then a part of the trouser or hose, or to other reason. This oscillation in both directions is an example of false valid movement which would mean in and out of the shoe. Such oscillations also occur while retracting the foot. That is noise. Noise can occur as high amplitude and high frequency oscillation, due to the variation of the reflexivity of the clothes. This noise oscillation can be higher in amplitude than the effective oscillation determined by the variation of reflexivity from the floor to the clothes which is the useful information. This noise oscillation is also higher in frequency due to the speed of inserting/retracting the foot out of the spot.

In the example FIG. 3a, at approximately one second, while inserting the foot there is a peak, then the level of variation goes back while the foot is in the light spot 102, then again at approximately 3.5 seconds there is another peak while extracting the foot.

In the example shown in FIG. 4a, at approximately 1.6 seconds, while inserting the foot there is a peak, then the level of variation goes up more while the foot is in the light spot 102, then again at approximately 3.1 seconds there is another peak while extracting the foot.

It is to be noted that the variation for the kick-in gesture or the kick-out gesture does not always evolve in the same direction, meaning rising or falling variation.

To eliminate the noise by filtering the signal, meaning to keep only the effective signal representative of a triggering movement and flatten the noise.

In order to eliminate the noise by filtering the signal, meaning to keep only the effective signal representative of a triggering movement and flatten the noise, a low-pass filter or average means may be used. More precisely, a customized low pass filter may be used. The custom type of low pass filter is advantageously a mean moving average on a predefined number of samples, with an added zero-order hold on a time base of said predefined number of input samples. Indeed, classical low pass filter or moving mean average are only decreasing the amplitude of the noise, while adding a zero-order hold to a mean-moving-average ensures to completely flatten a false pulse.

FIGS. 3b and 4b show the resulting function (in solid line) after using a mean average filter with zero-order hold on samples of the ADC signal waveform (in dotted line). For that, an acquisition sampling time is defined, as an example 6 ms, of course this acquisition time is tunable.

The average is calculated for a predefined number "N" of samples, e.g. each 60 samples which matches 360 ms, and only once per "N" samples. Of course, this predefined number "N" is tunable or 360 ms duration is tunable depending on the predefined number "N" of samples, for example the duration may be comprised between 0.1 s to 0.4 s.

Whenever an average is calculated, this average is hold for the given predefined number "N" of samples, e.g. 60 samples.

The average is calculated based on a single variable, which is the sum of the inputs, quantified each "N" samples, and after that reset. The mean moving average with added zero-order hold is also better than a classical moving mean average, as the implementation is simpler than the implementation of a moving average filter, which would need to store independently "N" variables.

In order to recognize the specific movement performed, the method according to the invention aims at quantifying the variations of the performed movement so as to link them to the different steps of the performed movement.

To that end, according to a preferred embodiment, the filtered signal is compared with a reference value.

For that purpose, in a non limiting embodiment, a predefined number "M" of previous values of the filtered signal of the floor measurement can be stored. The sampling time may be chosen longer than the sampling time for flattening the noise An average can be calculated once at several times, for example "M" times. The reference value is updating by storing the value of the filtered signal of the floor measurement from time to time.

Another mean average filter may be used for calculating the reference value. As an example, the mean average filter may have as input the output of the mean average filter with zero-order hold used for eliminating the noise.

The samples for calculating the reference value does not include any sample marked with pulse detection. Therefore, in case of a pulse detection meaning a movement stimulus in the sensor detection area, the input of the mean average filter is reset after detection of a pulse in such a way that it does not include any sample marked with pulse detection and the output of the mean average filter is kept unchanged during and after this detection. In other words, the samples from the time a pulse is detected are removed from the input vector of the mean average filter, and replaced by previous values of the signal.

The reference value is drawn as a solid line in FIG. 3c or 4c for illustrative purpose.

The filtered signal (in dashes) is compared to the reference value (in solid line).

An example for comparing the filtered signal to the reference value is to calculate the absolute value of the difference between the filtered signal and the reference value.

This absolute difference value is for instance compared to a preset threshold. This threshold can be determined based on several measurements under several conditions. By way of a non limited example, the threshold may be 9% of absolute variation.

According to the described embodiment, whenever the absolute difference between the filtered signal and the reference value is higher than the preset threshold, the signal change detection state can be set to 100%. As schematically illustrated in bold line, the amplitude of the signal change detection stated function rises until 100%. And then, when the absolute difference between the filtered signal and the reference value is back lower than the preset threshold, the signal change detection state falls down.

The method may further enable to differentiate the different steps of the movement performed in the sensor detection area.

For that purpose, the method comprises a state-machine that have the role of keeping the track of the variations based on the absolute difference calculated between the filtered signal and the floor measurement reference value. According to the described embodiment, the state-machine is tracking the variations and decides that the correct sequence is met or not, without need to take care if the signal-change detection state waveform is rising or falling.

It is also possible to replace the calculation of the absolute value by an additional checking, that a falling edge occur after a rising edge and vice-versa, that a rising edge occur after a falling edge, in order to qualify a kick-out, but this would bring no benefit at all: Replacing absolute value calculation by this check would only increase the complexity of the algorithm and obtain an identical outcome.

In order to illustrate this, according to the described embodiment, when the absolute difference between the filtered measurement and the reference value exceeds the preset threshold, that is when the signal change detection state waveform is rising up to the maximum amplitude, this matches a kick-in stimulus.

When the maximum amplitude of signal change is reached (100%), this corresponds to the full insertion of the foot for instance in the light spot 102.

Then, when the absolute difference between the filtered measurement and the reference value does not exceed the preset threshold, that is when the signal change detection state waveform is falling down from the maximum amplitude, this matches a kick-out stimulus.

The order of the different detected steps of the performed movement may be defined and stored.

Once, the moving stimuli are differentiated, the method then allows validating or not the performed movement.

For that purpose, the time elapsed during the step of waiting in the light spot 102 is measured by a counter that was started and compared to a predefined time interval. Indeed, the step of stopping on the light spot 102 lasts a predefined time interval. This time interval comprises a minimum of about 0.5 s, about 1 s and a maximum of about 3 s, of about 9 s.

The predefined time interval, particularly the maximum can be calibrated by the user for instance. The smaller the gap between the maximum and minimum of the time interval, the better the rejection of false movements is. In other words, a narrow time interval advantageously reduces the risk of validating a false movement, for instance due to intrusion of an object or a small animal in the sensor detection area.

In case that duration constraint is not met by the movement, this may be indicated though an audio and/or visual warning, for instance by a special blinking of the spot.

The method further comprises a step S40 of identifying an authorized triggering movement. That means identifying if the movement of the foot or hand or any other human part, is made according or not to the predefined triggering sequence.

More precisely, it has to be identified if the triggering movement performed by the user U is realized in the correct sequence order. According to the described embodiment with a kick-in gesture, a lapse of time of waiting in the light spot 102, and a kick-out gesture, the absolute variations tracked by the state-machine has to be in the following order: a rising absolute variation until reaching the maximum amplitude for the predefined lapse of time, e.g. between 1 s to 3 s, and then a falling absolute variation.

The method permits to open the trunk for instance, when the foot is completely out of the spot. Thus, the movement can be validated only after the value measured by the sensor 13 returned to the value before the kick-in gesture.

The user U has to perform the predefined triggering sequence in the correct order. Of course, the user U has to learn to use this specific approach (the predefined triggering sequence in correct order) in order to open it.

Furthermore, according to an embodiment a time window to place the foot or hand into the light spot 102 should be predefined, for instance between two seconds and thirty seconds, otherwise the triggering request performed by the user U is ignored by the opening control device 1. In that case, the method may comprise a step of measuring the time elapsed between the step S10 of activating the virtual switch 102 and the moment of placing the user's part in the light spot 102, and a step of determining if the measured time is comprised in the predefined time window.

If the user U doesn't stop on the light spot 102 during its predefined time window, the projection means 9 may stop the projection of the light spot 102.

When the predefined conditions (correct sequence order, and time constraints) are met, the opening control device 1 identifies that a correct triggering sequence is detected implying an intention of the user U.

Moreover, the method aims at providing a real-time feedback to the user. Particularly, if the movement of the foot or hand for example is not performed according to the predefined trigger sequence, a signal may be sent to indicate to perform again the triggering sequence. On the contrary, if the insertion of the authorized user's part has been recognized, information may be given for example either by changing the color of the spot, either by changing the shape of the spot, either by changing from a steady spot to a blinking spot or by switching on the brake light.

Step S50 authorizes the opening of the vehicle movable panel 100 if the predefined triggering sequence has been performed in the correct order, and if the one or more time constraints are met, for instance if the step of waiting on the light spot 102 duration is comprised in the predefined time interval.

As a consequence, the opening of the vehicle movable panel 100 is achieved only if the movement of the user U is made according to a precise triggering sequence in a correct order and in a specified range of time for at least one step of the triggering sequence. A signal may be sent for authorizing the opening of the movable panel 100 and the opening control device 1 can trigger the opening of the movable panel 100.

The projection of the light spot 102 may be stopped.

Then, the movable panel 100 is opened, the user U may get in the vehicle or put something in the trunk.

Thus, this method allows defining a precise triggering sequence according to a predetermined order and advantageously with a certain lapse of time for keeping the foot or hand in the light spot.

Through such a method and corresponding opening control device, the opening of the movable panel 100 of the motor vehicle V is reliable and efficient.

Furthermore, in order to increase the rejection of false detection, for instance in the case when the user U is walking around the vehicle while not focusing on the opening of the vehicle, e.g. speaking at the mobile phone, the signals detected by approach sensors 3, in particular relative to a direction of movement, can be correlated with the signals detected by the sensor 13 intended for detecting the triggering sequence. Indeed, information on the direction of movement of the user U reflecting that the user U walks around the vehicle can invalidate a pulse detected by the sensor 13 that appear unintended for triggering the opening of the movable panel. This is particularly advantageous, in case the user performs a correct triggering sequence with a timing that met the constraints, such movement can be detected by the approach sensors and the detection can be invalidated.

The variation level on the approach detection sensor 3 should increase similarly on the sensor 13 for acquiring measurement relative to a triggering sequence performed by the user U. The variation level does not decrease on one sensor while increasing on another because this means that the subject might be just walking around the car. The movable panel as the trunk spot does not be triggered in this case.

Opening Control Device for a Motor Vehicle

Referring back to FIG. 1, the invention relates to an opening control device 1 for a motor vehicle V. Such opening control device 1 is configured to perform the steps of the method previously described.

The opening control device 1 may comprise:
a detection device comprising for instance at least one optical detector 3 for detecting the approach of a user U in the vicinity of the vehicle V in order to activate opening command means of an opening control device for opening a movable panel 100 of the vehicle V, and
authentication means (not illustrated) for verifying that the detected user U near the vehicle V is an authorized user for unlocking the vehicle V.

The optical detector 3 is mounted on the vehicle V. According to one embodiment, the optical detector 3 is arranged on the vehicle movable panel 100 to be opened, such as a side door or a tailgate 7.

The optical detector 3 comprises a transmitter and a receiver. The transmitter is able to project a detection beam. Advantageously, the projected detection beam is of wavelength of invisible spectrum for human, infrared beam in a preferred embodiment. Thus, the optical detector 3 is advantageously an infrared detector 3.

The authentication means (not illustrated) for verifying that the detected user U, also named user U, near the vehicle V is an authorized user for unlocking the vehicle V may comprise an antenna able to communicate with an identifier such as a transponder carried by the user U, for example in the key, or disposed adjacent to the user U. The transponder is adapted to receive a signal sent by the antenna.

The antenna is connected to identifying means on-board. This identifying means may determine if the user holding or adjacent to the transponder is an authorized user.

According to the invention, the opening control device 1 comprises at least one processing means for activating at least one virtual switch 102 with which an authorized user U has to interact.

A virtual switch comprises for example a light spot 102.

In this case, the opening control device 1 comprises a light projection means 9. The light projection means 9 is mounted on the vehicle V, for example on the movable panel 100 such as a side door or the tailgate (FIG. 1). The light projection means 9 may comprise one or more diodes to achieve one or more light beams. The light beam may be of any color. The light beam is projected on the ground on which the vehicle V stands thus forming a light spot or pattern 102 on the ground as shown in FIG. 1. The light spot 102 may be of any shape, including a luminous round, an arrow indicating a direction, a cross. The user U has to interact with this light spot 102 in order to trigger the opening of the movable panel 100. As a non limiting example, the light spot 102 may be aligned with regard to the longitudinal axis of the vehicle V as illustrated in FIG. 1. Of course, other orientations are possible.

The light spot 102 may be projected only for the predefined time window previously discussed, and the user U has to stop on the light spot 102 during this predefined time window.

The opening control device 1 further comprises processing means for determining if there is an intention to open the movable panel 100. The determination processing means are configured to determine if a movement command by placement or movement of one human part, such as one hand or foot, is made in accordance with a predetermined manner and if the movable panel 100 can be opened or not.

The predetermined manner is a triggering sequence.

More precisely, the processing means comprise means for:
acquiring a measurement signal of a movement performed by the user U in a measurement area,
eliminating the noise by filtering the signal,
identifying if the movement performed by the user U is according to a predefined triggering sequence in a predefined correct order with at least the following steps: moving at least one user's part towards the light spot 102, keeping the user's part in the light spot 102 and moving the user's part outside the light spot 102, and
determining if the movement performed by the user U meets one or more predefined specific time condition.

More precisely, the opening control device 1 comprises at least one sensor, for acquiring a measurement signal of the movement performed by the user U, for example an optical sensor 13 such as an infra-red sensor.

The optical sensors 13 may be configured to detect any variation from the light beam in order to detect if the user has performed the predefined correct triggering sequence. According to the embodiment of FIG. 1, the optical sensor 13 is arranged on the movable panel 100 to be opened, for instance on the tailgate.

The optical detector 3, the light projection means 9 and the optical sensors 13 may be arranged close relative to each other, for example on or near the rear registration plate.

The optical sensors 13 are intended to detect any variation in brightness due to interception of a light beam by an object or by a human part, such as foot or hand.

The optical sensors 13 may be connected to the determination means which determine that the movement has or has not been done properly, meaning according to the predefined trigger sequence as explained above. The determination means may trigger the opening of the movable panel 100 when the movement has been done properly or not to trigger the opening of the movable panel 100 when the movement has not been done properly.

The opening control device 1 may also comprises at least one processing means connected with this virtual switch optical sensor 13 for determining when the user U has completely freed up the light spot 102.

According to an embodiment, the opening control device 1 may comprise calibration means able to detect when the environmental conditions of the vehicle V are changing, such as the texture of the floor has changed, and to trigger a sensor calibration routine.

The filtering means may include a mean average filter with zero-order hold for eliminating the noise.

The opening control device 1 may comprise an analog to digital converter for converting the measurement signal before filtering.

Moreover, the opening control device 1 comprises means for identifying if the movement performed by the user U is according to the predefined triggering sequence in the correct order.

For that purpose, the opening control device 1 may comprise at least one processing means for calculating a reference value based on the floor measurement, such as a mean average filter. This mean average filter may have as input the output of the mean average filter with zero-order hold used for eliminating the noise of the signal, wherein each detected pulse reflecting a user gesture is removed.

The opening control device 1 may further comprise processing means for comparing the filtered signal, calculated for instance through the mean average filter with zero-order hold, with the reference value, calculated for instance through the mean average filter. To that end, this comparison means is able to receive information from the mean average filter with zero-order hold and from the second mean average filter.

The opening control device 1 may also comprise means for quantifying the variations of the relevant effective signal based on the comparison results, for instance by comparing the absolute difference between the filtered signal and the reference value with a preset threshold.

The opening control device 1 may also comprise means for identifying the steps of the movement performed by the user U based on the quantified variations, and for determining if the steps have been performed in the correct predefined order. More precisely, processing means may achieve a signal change detection state which is set to the maximum value whenever the absolute difference exceeds the preset threshold.

Further, as described before, a predefined time interval for the moment of keeping the user's hand or foot on the light spot 102 has to be respected. For that purpose, the opening control device 1 may further comprise means for measuring the time elapsed during the step of keeping the hand or foot on the light spot, that is measuring how long the user U places one user's part in the light spot 102, and means for determining if the lapse of time is comprised in the predefined time interval.

Moreover, the opening control device 1 may comprise an interface in the vehicle 1 allowing the user's calibrating preferences of time conditions, notably for the maximum duration of keeping his/her hand or foot in the light spot 102. As a matter of fact, the opening control device 1 may comprise storing means for storing the time conditions specified by the user.

Also, as previously described, a time window for placing the hand or foot in the light spot 102 can be predefined. In that case, the opening control device 1 comprises at least one processing means for measuring the time elapsed between activating the virtual switch 102 and the placement of the user's part in the light spot 102, and determining if the measured time is comprised in the predefined time window.

Preferably, the opening control device 1 may comprise feed-back means connected with the virtual switch sensor 13, so as to warn the user U when interacting with the light spot 102, for example when a time constraint is not respected, and/or when the triggering movement is correct or not. The warning can be an audio and/or visual warning, such as blinking the light spot 102, or switching on the brake light for instance.

The opening control device 1 further comprises processing means for authorizing the opening of the movable panel 100 if an intention to open the movable panel is detected. Those means are advantageously able to receive information from processing means configured for determining if the one or more time constraints are fulfilled, and from means configured for identifying the steps of the movement performed by the user in the sensor 13 measurement area and if the predefined triggering sequence is performed in the correct order.

The invention has been described relating to an embodiment with one virtual switch comprising one projected light spot 102 and one associated sensor 13. Of course, the method according to the invention could be implemented with an opening device 1 providing a guide means of the direction of movement of the foot, said guide means being for instance centered on the light spot such as in an arc of a circle centered on the light spot, and being for example realized as light patterns such as light rounds around said light spot.

Further, the order for achieving some steps or sub-steps of the method as previously described can be changed.

The invention claimed is:

1. A method for opening a movable panel of a motor vehicle, comprising:
    activating at least one virtual switch with projection of at least one light spot with which an authorized user has to interact;
    determining if there is an intention to open the movable panel; and
    authorizing the opening of the movable panel when an intention to open the movable panel is detected,
    wherein determining the intention to open the movable panel comprises:
        acquiring a measurement signal of a movement performed by the user in a measurement area,
        eliminating the noise by filtering the signal,
        identifying when the movement performed by the user is according to a predefined triggering sequence in a predefined correct order with at least the following steps: moving at least one user's part towards the light spot, keeping the user's part in the light spot and moving the user's part outside the light spot, and determining if at least one step of the movement performed by the user meets a predefined specific time condition;
    measuring the time elapsed between activating the virtual switch and the moment of placing the user's part in the light spot, and determining when the measured time is comprised in a predefined time window, the filtering of the signal being executed by using a mean average filter with zero-order hold, and
    calculating a reference value based on a floor measurement; and
    comparing the filtered signal with the reference value to identify when the movement performed by the user is according to the predefined triggering sequence.

2. The method as set forth in claim 1, further comprising:
    measuring the time elapsed for the step of keeping in the light spot; and
    determining if the measured elapsed time is comprised in a predefined time interval for keeping the user's part in the light spot.

3. The method as set forth in claim 2, wherein the predefined time interval for keeping the user's part in the light spot sets a minimum in the range of a half second to one second, and a maximum in the range of three to nine seconds.

4. The method as set forth in claim 1, further comprising:
measuring the time elapsed between activating the virtual switch and the moment of placing the user's part in the light spot; and
determining if the measured time is comprised in a predefined time window.

5. The method as set forth in claim 4, wherein the predefined time window between activating the virtual switch and placing the user's part in the light spot is between two to thirty seconds.

6. The method as set forth in claim 1, further comprising:
quantifying the variations of the effective signal after filtering for eliminating the noise;
based on the quantified variations, identifying the steps of the movement performed by the user;
determining if at least one of the identified steps meets the predefined specific time constraint; and
determining if the steps have been performed in the correct predefined order.

7. The method as set forth in claim 6, further comprising:
calculating a reference value based on the floor measurement; and
comparing the filtered signal with the reference value, wherein the variations of the effective signal are quantified based on the comparison results.

8. The method as set forth in claim 7, further comprising comparing the absolute difference between the filtered signal and the reference value with a preset threshold for quantifying the variations.

9. The method as set forth in claim 1, further comprising sending a warning signal to indicate to perform again the triggering sequence, when the triggering sequence has been performed in an incorrect order.

10. The method as set forth in claim 1, further comprising preliminary steps of detecting the approach of the user in the vicinity of the vehicle; and identifying if the detected user is authorized to unlock the vehicle through authentication means.

11. An opening control device for opening a movable panel of a motor vehicle, comprising:
at least one processing means for:
activating at least one virtual switch with projection of at least one light spot with which an authorized user has to interact,
determining if there is an intention to open the movable panel, and
authorizing the opening of the movable panel when an intention to open the movable panel is detected; and
at least one means for:
acquiring a measurement signal of a movement performed by the user in a measurement area,
eliminating noise by filtering the signal, the filtering of the single being executed by using a mean average filter with zero-order hold,
identifying when the movement performed by the user is according to a predefined triggering sequence in a predefined correct order with at least the following steps:
moving at least one user's part towards the light spot,
keeping the user's part in the light spot and moving the user's part outside the light spot, wherein the identifying step is executed by comparing the filtered signal with a reference value calculated based on a floor measurement, and
determining if the movement performed by the user meets a predefined specific time condition.

12. The opening control device as set forth in claim 11, further comprising at least one sensor, for acquiring a measurement signal of the movement performed by the user.

13. The opening control device as set forth in claim 11, comprising a mean average filter with zero-order hold for filtering the measurement signal and eliminating the noise.

14. The opening control device as set forth in claim 11, further comprising an analog to digital converter for converting the measurement signal before filtering.

15. The opening control device as set forth in claim 11, further comprising at least one processing means for calculating a reference value based on the floor measurement.

16. The opening control device as set forth in claim 11, further comprising:
a detection device for detecting the approach of a user in the vicinity of the vehicle, including one or more optical detectors; and
authentication means for identifying if the detected user is authorized to unlock the vehicle.

17. The opening control device as set forth in claim 16, wherein the one or more optical detectors are infrared detectors.

18. The opening control device as set forth in claim 15, wherein the at least one processing means is a mean average filter.

19. The opening control device as set forth in claim 12, wherein the at least one sensor is an infrared sensor.

* * * * *